US012477291B2

(12) United States Patent
Faubel et al.

(10) Patent No.: US 12,477,291 B2
(45) Date of Patent: Nov. 18, 2025

(54) ACOUSTIC INTERFERENCE SUPPRESSION THROUGH SPEAKER-AWARE PROCESSING

(71) Applicant: Cerence Operating Company, Burlington, MA (US)

(72) Inventors: Friedrich Faubel, Ulm (DE); Jonas Jungclaussen, Ulm (DE); Tim Haulick, Ulm (DE); Markus Buck, Ulm (DE)

(73) Assignee: CERENCE OPERATING COMPANY

( * ) Notice: Subject to any disclaimer, the term of this patent is extended or adjusted under 35 U.S.C. 154(b) by 201 days.

(21) Appl. No.: 18/386,359

(22) Filed: Nov. 2, 2023

(65) Prior Publication Data

US 2024/0196145 A1 Jun. 13, 2024

Related U.S. Application Data

(60) Provisional application No. 63/431,382, filed on Dec. 9, 2022.

(51) Int. Cl.
*H04R 29/00* (2006.01)
*H04R 1/08* (2006.01)
*H04S 7/00* (2006.01)

(52) U.S. Cl.
CPC ............ *H04R 29/004* (2013.01); *H04R 1/08* (2013.01); *H04S 7/40* (2013.01); *H04R 2410/03* (2013.01); *H04S 2400/11* (2013.01); *H04S 2400/15* (2013.01)

(58) Field of Classification Search
CPC .......... G10L 17/00; G10L 2021/02082; G10L 21/0208; G10L 25/30; G10L 15/16; H04M 3/002; H04M 9/082; H04R 1/08; H04R 2410/03; H04R 29/004; H04S 2400/11; H04S 2400/15; H04S 7/40
See application file for complete search history.

(56) References Cited

U.S. PATENT DOCUMENTS 10,325,591 B1 6/2019 Pogue et al.
11,521,635 B1 12/2022 Chhetri et al.
2016/0098989 A1 4/2016 Layton et al.
2018/0033454 A1* 2/2018 Hardek .................. G10L 25/84

FOREIGN PATENT DOCUMENTS

CN 109087662 B 10/2021
EM 3474280 A1 4/2019

* cited by examiner

*Primary Examiner* — Kile O Blair
(74) *Attorney, Agent, or Firm* — Burr & Forman

(57) ABSTRACT

Disclosed are systems, methods, and other implementations for acoustic interference suppression, including a method that includes obtaining a multi-source sound signal sample combining multiple sound components from a plurality of sound sources in a sound environment, with the plurality of sounds sources including one or more interfering sound sources produced by one or more loudspeakers in the sound environment, determining interfering sound characteristics for one or more sound signals that correspond to the one or more interfering sound sources, and suppressing at least one of the multiple sound components associated with the determined interfering sound characteristics for at least one of the one or more sound signals.

20 Claims, 5 Drawing Sheets

ACOUSTIC INTERFERENCE SUPPRESSION THROUGH SPEAKER-AWARE PROCESSING

CROSS REFERENCE TO RELATED APPLICATIONS

This application claims the benefit of U.S. Provisional Application No. 63/431,382, filed Dec. 9, 2022, the contents of which are incorporated herein.

BACKGROUND

The present disclosure relates to suppression (e.g., attenuation or removal) of acoustic interference components, in particular to removal of components with known or determined speaker characteristics, in audio signals.

Speech communication systems in cars use microphones and loudspeakers that are built in the car cabin. Inherently, the microphones do not pick up only the desired speech signals of the passenger, but also the acoustic feedback of the loudspeaker output. Removal of components in microphone signals that come from the loudspeaker output is often referred to as "echo cancellation" referring to an "echo" of the loudspeaker leaking into the microphone signal. Conventional systems for acoustic echo cancellation make use knowledge of the signal to be cancelled/suppressed that is being played over the loudspeakers generally in the form of the time domain driving signal for the loudspeaker, which may be referred to as a "reference signal."

In some situations, a reference signal for the component to be cancelled is not available, thereby limiting the applicability of conventional echo cancellation approaches. Furthermore, in situations in which a desired signal represents a user's voice and the interfering signal is another's real or synthesized voice, cancellation of the interfering signal may be particularly challenging.

SUMMARY

In a broad aspect, one or more examples described herein provide an effective way of cancelling or suppressing an interfering signal when a time domain reference signal is not available, and where both a desired signal and the interfering signals comprise voice signals. For example, it may be desirable to cancel a synthesized voice signal of a voice assistant that is captured in conjunction with a desired voice signal of a user. In a number of examples, certain characteristics of the interfering voice signal may be known (or determinable at runtime), and the cancellation procedure may be adapted to make use of those characteristics.

In some examples, the characteristics of the interfering signal form a numerical vector representation of the voice or the speaker of the voice, and such a representation may be referred to as an "embedding" of the voice. Such an embedding is then used as an input and/or configuration setting for an interference cancellation processing of a microphone signal. Such an approach may be largely agnostic to the characteristics of the desired speaker, which may be beneficial when substantially more information (i.e., data) is available to characterize the interfering voice than may be available to characterize the desired voice.

In some examples, the interfering voice is a synthesized voice, which may come from a fixed set of available output voices of a voice based assistant. In such a situation, the embeddings of these voices may be precomputed and selected at runtime, for example, by way for a control signal from the voice assistant identifying the voice being used, or by way of an automated speaker recognition (e.g., from a closed set of available synthesizer voices).

In an example, the approach uses a machine learning system (e.g., implemented as a neural-network system, or implemented using some other machine-learning architecture) to suppress undesirable interference acoustic components. The machine-learning system may be configured according to a universal model that receives the sound characteristics information that causes the machine-learning system to perform acoustic suppression for the sound source corresponding to the received sound characteristics information. The machine-learning system thus acts as a source-aware system that behaves to suppress acoustic components according to the determined characteristics.

Thus, in certain variations, a method for acoustic interference suppression is provided that includes obtaining a multi-source sound signal sample combining multiple sound components from a plurality of sound sources in a sound environment, with the plurality of sounds sources including one or more interfering sound sources produced by one or more loudspeakers in the sound environment, determining interfering sound characteristics for one or more sound signals that correspond to the one or more interfering sound sources, and suppressing at least one of the multiple sound components associated with the determined interfering sound characteristics for at least one of the one or more sound signals.

Embodiments of the method may include at least some of the features described in the present disclosure, including one or more of the following features.

At least one of the one or more interfering sound sources may include a voice assistant audio produced using a voice assistant profile selected from a plurality of voice assistant profiles maintained by a text-to-speech voice assistant system.

Determining the interfering sound characteristics may include selecting from data storage, storing respective interfering sound characteristics for the plurality of voice assistant profiles, a selected interfering sound characteristics corresponding to the selected voice assistant profile.

Suppressing the at least one of the multiple sound components may include receiving, by an interference suppressing machine learning system trained to controllably suppress voice assistant sound components according to interfering sound characteristics respectively associated with the plurality of voice assistant profiles, the selected interfering sound characteristics corresponding to the selected voice assistant profile, and sound data representative of the multi-source sound signal sample. The suppressing may also include processing the sound data by the interference suppressing machine learning system according to the selected interfering sound characteristics to produce output data representative of an output sound sample in which at least one of the multiple sound components, associated with sound produced according to the selected voice assistant profile, is suppressed.

Processing the sound data with the interference suppressing machine learning system may include determining, by the machine learning system, filter coefficients for a time-varying linear filter based on at least part of the sound data and the selected interfering sound characteristics, and applying the determined filter coefficients to at least part of a representation of the multi-source sound signal sample to yield an interference suppressed output sound signal.

Processing the sound data with the interference suppressing machine learning system may include generating, by the interference suppressing machine learning system, predicted output representative of the output sound sample in which the at least one of the multiple sound components is suppressed.

Determining interfering sound characteristics may include receiving the one or more sound signals that produce the one or more interfering sound sources, and deriving from the one or more sound signals the determined interfering sound characteristics.

Suppressing the at least one of the multiple sound components may include receiving by an interference suppressing machine learning system, trained to controllably suppress the at least one of the multiple sound components according to the interfering sound characteristics, the derived interfering sound characteristics and sound data representative of the multi-source sound signal sample, and processing the sound data by the interference suppressing machine learning system according to the interference data to produce output data representative of an output sound sample in which the at least one of the multiple sound components is suppressed.

Processing the sound data with the interference suppressing machine learning system may include determining, by the interference suppression machine learning system, filter coefficients for a time-varying linear filter based on at least part of the sound data and the interference data, and applying the determined filter coefficients to at least part of a representation of the multi-source sound signal sample to yield an interference suppressed output sound signal.

Processing the sound data with the interference suppressing machine learning system may include generating, by the interference suppressing machine learning system, predicted output representative of the output sound sample in which the at least one of the multiple sound components is suppressed.

The determined interfering sound characteristics may include one or more of, for example, a vector representation in an embedding vector space for the one or more sound signals, spectral characteristics for the one or more sound signals, temporal characteristics for the one or more sound signals, and/or identifier data representative of identify of sources producing the one or more sound signals.

Suppressing the at least one of the multiple sound components may include suppressing the at least one of the multiple sound components without using a reference signal for any of the plurality of sound sources, to reduce echo effects caused by sound components produced by the one or more loudspeakers.

Suppressing the at least one of the multiple sound components may include receiving by the interference suppressing machine learning system interference data representative of the interfering sound characteristics, receiving sound data representative of the multi-source sound signal sample, and processing the sound data by the interference suppressing machine learning system according to the interference data to produce output data representative of an output sound sample in which the at least one of the multiple sound components is suppressed.

Receiving the sound data may include converting, by an acoustic transducer device, a raw sound sample into a time-domain sound signal, transforming the time-domain sound signal into a transformed domain representation, and extracting features from the transformed domain representation to produce the sound data.

Extracting the features may include deriving from the transformed domain representation one or more of, for example, complex signal spectra features, spectral magnitude features, log spectral magnitude features, log mel spectra features, and/or mel-frequency cepstral coefficients.

The predicted output may include one or more of, for example, a temporal representation of the output sound sample, and/or a spectral representation of the output sound sample.

Suppressing the at least one of the multiple sound components may include providing the interfering sound characteristics to a machine learning system executing a single machine learning model trained to controllably suppress acoustic interference sound components in input sound signals according to different sound characteristics for a plurality of interference sound signals associated with one or more speakers or one or more voice assistant profiles sources, and processing sound data, representative of the multi-source sound signal sample, provided as input to the machine learning system based on the determined interfering sound characteristics provided to the machine learning system to produce output data representative of an output sound sample in which the at least one of the multiple sound components is suppressed.

Providing the determined interfering sound characteristics to the machine learning system may include providing the determined interfering sound characteristics to one or more of, for example, an input layer of the machine learning system, and/or one or more intermediate hidden layers of the machine learning system.

In certain variations, an acoustic interference suppression system is provided that includes an audio acquisition section to obtain a multi-source sound signal sample combining multiple sound components from a plurality of sound sources in a sound environment, with the plurality of sounds sources including one or more interfering sound sources produced by one or more loudspeakers in the sound environment, and an acoustic interference suppression controller in electrical communication with the audio acquisition section. The acoustic interference suppression controller is configured to determine interfering sound characteristics for one or more sound signals that correspond to the one or more interfering sound sources, and suppress at least one of the multiple sound components associated with the determined interfering sound characteristics for at least one of the one or more sound signals.

In certain variations, a non-transitory computer readable media is provided that stores a set of instructions, executable on at least one programmable device, to obtain a multi-source sound signal sample combining multiple sound components from a plurality of sound sources in a sound environment, with the plurality of sounds sources including one or more interfering sound sources produced by one or more loudspeakers in the sound environment, determine interfering sound characteristics for one or more sound signals that correspond to the one or more interfering sound sources, and suppress, based on the determined interfering sound characteristics, at least one of the multiple sound components associated with respective sound characteristics matching the interfering sound characteristics for at least one of the one or more sound signals that produce the one or more interfering sound sources.

In certain variations, a computing apparatus is provided that includes an audio acquisition section to obtain a multi-source sound signal sample combining multiple sound components from a plurality of sound sources in a sound environment, with the plurality of sounds sources including one or more interfering sound sources produced by one or more loudspeakers in the sound environment, and one or more programmable devices to perform acoustic interference suppression according to any of the method steps described above.

In certain variations, a non-transitory computer readable media is provided that is programmed with a set of computer instructions executable on a processor that, when executed, cause the operations comprising any of the various method steps described above.

Embodiments of the above system, the apparatus, and/or the computer-readable media may include at least some of the features described in the present disclosure, and may be combined with any other embodiment, variation, or features of the method described herein.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
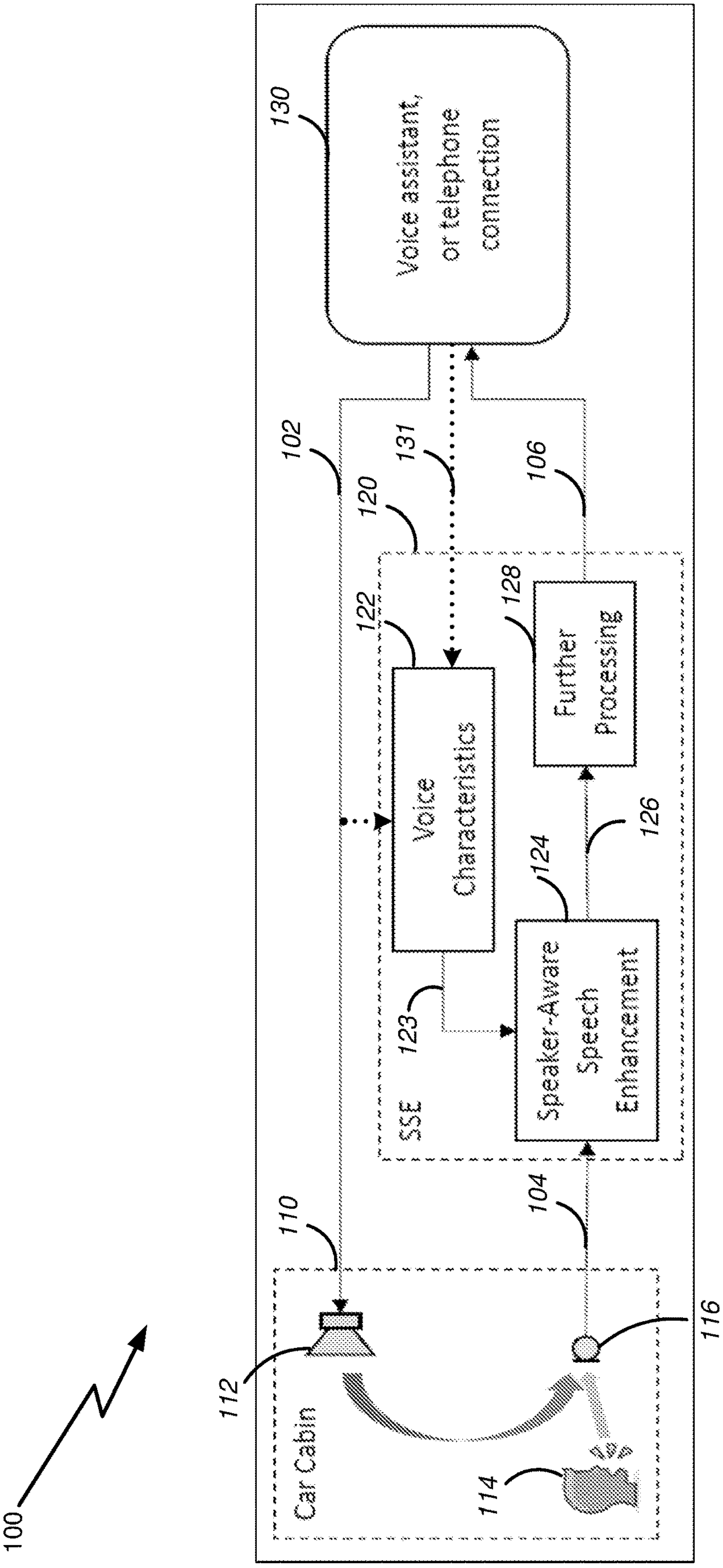
FIG. 1 is a schematic diagram of an example acoustic interference suppression system.

The interference suppression framework described herein implements a source-aware acoustic interference platform, which adapts acoustic interference suppression behavior (in terms of the levels of attenuation applied to stationary and non-stationary noise components) in accordance with determination/identification of interfering sound sources that are reproduced on loudspeakers within a local sound environment (e.g., the cabin of a vehicle). Consequently, the framework is configured to remove such interfering sound sources (which are typically non-local or non-native to the sound environment), thus reducing (or altogether cancelling) "echo" effects that would otherwise be caused by re-transmitting (through one or more microphones deployed in the sound environment) components reconstructed from sound signals delivered to the loudspeakers. In some examples, the interfering sound sources are synthesized voice sources produced by a local or remote voice assistant, which may be explicitly identified or whose characteristics may be automatically determined. In various examples the interfering sound sources may be sound signals corresponding to remote speakers communicating with occupants of a vehicle.

the suppression of interfering sound sources can be performed by using a machine learning system trained to suppress interfering sound components in accordance with interfering sound characteristics for the sound signals that result in the interfering sound sources. The sound characteristics are provided to the machine learning system which conditions or actuates the machine learning system to cause it to suppress or remove components corresponding to the interfering sound characteristics. A convenient way to determine the sound characteristics to provide to the machine learning system is through a data storage module (e.g., a lookup table) that maintains the sound characteristics for a known set of sound signals/sources. Examples of sound characteristics that can be used to modulate, condition, or actuate the machine learning system include numerical vectors ("embeddings") representative of sound signal characteristics, spectral features of sound signals, identifier values that identify the particular source or signal (e.g., a known speaker, one of several known voice assistant profiles) corresponding to the sound components that are to be suppressed, etc.

As will discussed in greater detail below, the framework is implemented, in some embodiments, as a machine learning network that is trained (i.e., has its machine learning engine parameters optimized) to process a microphone audio signal and produce a clean audio output in which contribution from acoustic interference components is suppressed based on information indicative of or characterizing the acoustic interference source(s) that is (are) to be suppressed. The machine learning implementation (e.g., which may be realized according to one or more different machine learning architectures) receives noisy sound segments and interference characterization information (such information may be a compact representation of the sound source, such as a numerical vector referred to as an "embedding." an identifier identifying a source from a finite pool of sources, e.g., a known speaker, one of several known voice assistant profiles, signal features such as log mel spectra features, or mel-frequency cepstral coefficients, etc.) The machine learning network outputs data (e.g., filter coefficients or actual sound signal output) in which interference components are suppressed.

With reference to FIG. 1, a diagram of an example acoustic interference suppression system 100 is shown. The system 100 includes a communication link between a car cabin 110 and a node 130. The node 130 depicted in FIG. 1 is a module in which voice assistant processing, or communication connection processing (e.g., with remote users) is performed. The node 130 typically forms part of a local system, and generally includes signal transmission/receiving circuitry to transmit and/or receive communication signals between two network nodes (in this case, a node comprising the local circuitry at the car cabin 110). Communication signals (wireless or wired) intended to be transmitted to a remote communication node (to enable communication between two users) are sent via a communication unit/circuitry that may be a separate unit from the node 130.

As further illustrated in FIG. 1, sound signals received from a remote location (e.g., via wireless or wired network links), or produced by a local voice assistant system, are directed to a loudspeaker device 112 of the car cabin 110, which convert an electric signal representation of the sound signal(s) (be it in digital or analog form) to an acoustic signal. The sound signals directed from the node 130 correspond to interfering sound components since once those signals are reconstructed by the loudspeaker device 112, and subsequently picked up (sensed) by a microphone 116, the retransmission to the node 130, and downstream to a remote location, will result in echo. Therefore, to suppress reproduced interfering sound signals a speech signal enhancement (SSE) system 120 is implemented to process sound signals generated inside the car cabin 110 and to suppress interfering sound components in order to reduce echo effects. While FIG. 1 depicts one microphone and one loudspeaker device, any number of microphones or loudspeaker devices may be deployed in the acoustic environment in which the proposed interference suppression framework is implemented. Furthermore, while FIG. 1 depicts a car-based sound environment, the proposed approaches may also be used in relation to other types of sound environments, including home-based sound environment, office environments, public places environments, etc., and the framework described herein may similarly be used (or adapted) to implement appropriate acoustic interference suppression functionality within such environments.

The SSE system 120 includes a voice characteristics module 122 that is configured to determine, typically in compact form (e.g., identity of a particular source associated with a sound signals, one or more spectral characteristics such as log mel spectra or mel-frequency cepstral features, an embedding in a vector space, etc.) interfering sound characteristics for one or more sound signals 102 that produce the one or more interfering sound sources. In examples where the sound signals are for known acoustic sources, such as sound signals produced by a voice assistant profile from a finite pool of voice assistant profiles, or a known speaker wishing to communicate with an occupant of the sound environment (a speaker in the car, in this case), a data storage device (e.g., lookup table) may store the respective voice characteristics that are used to actuate or modulate a machine learning system that was trained based on such sound characteristics. In such examples, the node 130 may provide to the voice characteristics module a selection signal 131 identifying the particular speaking source (be it a known user, or a known voice assistant profile) that causes the voice characteristics module 122 to output the appropriate stored sound characteristics that is to actuate the speaker-aware speech enhancement unit 124.

Alternatively, in some examples, a copy of the actual sound signal 102 produced by the node 130 and communicated to the loudspeaker 112 may also be provided to the voice characteristics module which, in such example, is configured to derive (e.g., in real-time) the appropriate output to the unit 124. Though derivation of interfering sound characteristics may be more computational costly (and may require a more complicated implementation) it has the advantage that for new, unknown sources (e.g., a new voice assistant profile, or a new speaker) the voice characteristics module 122 will provide an inferred/derived voice characteristics that provide an approximation of the characteristics of the sound signal that is consistent with the sound characteristics that were used to train the system. For example, in embodiments in which the sound/voice characteristics module 122 is configured to produce an embedding vector, a machine learning system (implemented as a neural network, or any other appropriate machine learning system) is trained (optionally jointly with the training of a machine-learning implementation applied to the sound signal generated by the microphone 116) using a large corpus of recorded speech samples from multiple speakers, each of which is associated with an encoded vector (also referred to as an embedding). The encoded vectors define an embedding space representative of at least some voice characteristics for speakers in the large corpus (e.g., spectral domain characteristic). A target speaker, whether it is one of the speakers used to train the machine-learning implementation of the voice characteristics module 122 or a different speaker, provides a sample of speech that can be processed to a format compatible with the machine-learning system. The machine-learning implementation of the voice/sound characteristics module 122 uses the input provided (the representation of the speech sample provided by the arbitrary speaker) to generate (encode) an embedding vector that is representative of the arbitrary speaker's voice characteristics. The encoded embedding for the arbitrary speaker lies within the embedding space defined for the trained encoder.

In another example embodiment, the voice/sound characteristics module may be configured to produce (whether using a data storage such as a lookup table to provide a stored value, or as a processing machine to compute an element from the sound signal) an identifier that represents the source, from a known pool of sources (one or more known voice assistant profiles used to produce synthetic speech of unique voice characteristics, or one or more known speakers). In this example, the identity of the sound source may be determined based on metadata include with the sound signal 102 provided to the voice characteristics module 122, or it may be a value selected based on the selection signal 131 generated by the node 130. In yet further example embodiments, the voice characteristics module 122 may be configured to generate (using algorithmic/filtering-based processing), according to the sample input provided to it via the signal 102, one or more features such as spectral domain features like complex signal spectra features, spectral magnitude features, log spectral magnitude features, log mel spectra features, mel-frequency cepstral features, etc. Here too, such features may previously have been pre-computed and stored on a data storage implementation of the voice characteristics module 122, and the appropriate features data may be outputted by the module 122 and provided to the unit 124 in accordance with a selection signal 131. Other types of features, whether time-domain features, frequency domain features, or features extracted from some other type of representation of the sound signal sample fed to the voice characteristics module 122 may also be used. In the latter example embodiments, the extracted features represent the voice characteristics of the interfering source. Those extracted features can then be used by downstream components/modules to control the interference suppression operations of the system 100.

With continued reference to FIG. 1, the output of the voice characteristics module 122 is provided to a speaker-aware speech enhancement unit 124 configured to suppress, based on the determined interfering sound characteristics, at least one of the multiple sound components associated with respective sound characteristics matching the interfering sound characteristics for at least one of the one or more sound signals. As noted, in various example embodiments, the unit 124 may include an interference suppressing machine learning system, trained to controllably suppress the at least one of the multiple sound components according to the interfering sound characteristics provided by the voice characteristics module 122. The machine learning implementation included with the unit 124 receives sound data representative of the multi-source sound signal sample (including any sound components corresponding to the interfering sources) and further receives the interfering sound characteristics, and processes the sound data to produce output data representative of an output sound sample in which at least one of the multiple sound components is suppressed. The interfering sound characteristics can be provided to the system learning implementation (be it a neural network-based architecture or some other machine-learning architecture) either through an input layer of the machine-learning implementation, or to one or more of the intermediate layers to cause the machine-learning implementation to be adapted to produce output consistent with the interfering voice characteristics provided to the implementation.

Although not specifically illustrated in FIG. 1, the SSE system 120 may include an input processor (also referred to as input processing unit or input processing section) configured to perform one or more signal processing operations on the sound signal produced by the microphone 116. More particularly, the microphone 116 (also referred to as an acoustic transducer device) converts raw acoustic signals (comprising, for example, sound components produced by a local human speaker 114 and interfering sound components produced by the loudspeaker device 112) detected or sensed in the car cabin 110 (or within some other sound environment) into a time-domain sound signal 104. The signal 104 produced by the microphone 116 is typically digitized and converted into a digitized signal using an analog-to-digital converter (ADC, not shown in FIG. 1). The input processor of the SSE system 120 (which may be part of the unit 124, or a separate upstream unit situated between the microphone 116 and the unit 124) may perform several types of signal processing operations on the signal 104. For example, the input processor may be configured to perform signal conditioning on the time-domain sound signal (including removal of channel noise), transform the time-domain sound signal into a transformed domain representation, perform beamforming or array signal processing on the time-domain sound signal, etc. For instance, signal conditioning may include performing such operations as gain equalization (to produce a uniform, or near uniform, gain spectrum), latency adjustment, and other type of conditioning and filtering operations performed on the input audio signal. In another example, to perform the acoustic interference suppression it may be desirable to process the signal in a frequency domain representation instead of in the time-domain (e.g., in order to configure and then apply the machine learning engine to features derived from frequency domain components based on which the trained predicted output of the machine learning engine is produced). Thus, in various embodiments, the input processor is configured to transform the time-domain sound signal into the transformed domain representations such as Discrete Fourier Transform representation (e.g., performed through a Fast-Fourier Transform process), or any other frequency representation of segments of the time-domain audio signal. In various examples, the input processing may be applied to segments or blocks of a time-domain audio signal, e.g., blocks/segments with lengths of 16 ms, and a sample rate of 16 KHz.

As will be discussed in greater detail below in relation to FIG. 2, in various examples the SSE system 120 includes a feature extraction unit (such as a feature extractor 210 depicted in FIG. 2) that derives from a frequency domain representation extracted features that are sequentially fed into a machine learning engine (e.g., an artificial neural network such as a deep neural network (DNN), illustrated as DNN 220 in FIG. 2) trained using similarly extracted features of the training data. Examples of features extracted from the frequency representation signal include complex signal spectra features, spectral magnitude features, log spectral magnitude features, log mel spectra features, mel-frequency cepstral features, etc. Other types of features, whether time-domain features, frequency domain features, or features extracted from some other type of representation of the audio data, may also be used. The extracted features are provided as input to the machine learning engine, along with the interfering sound characteristics representative of the interfering sound components included in the sound signal, to controllably cause the output of the unit 124 to produce filter coefficients (e.g., time-variant filter coefficients implementing filters such as a Wiener filter, or some other filter(s) to suppress stationary and non-stationary noise) to remove sound components associated with interfering sound sources. In some example embodiments, the machine learning engine (included in the unit 124) may be provided with data representative of the actual time domain or frequency domain representations of the sound signal (which, optionally, may have been processed by an input processor upstream of the machine-learning engine to clean and format the signal before it is processed by the machine-learning engine). In such embodiments, the machine-learning engine receives the entirety of the signal (optionally broken into appropriate-sized segments), along with the interfering sound characteristics 123 (which controllably adapts the machine-learning engine to generate output that suppresses sound components whose sound characteristics most closely match, according to some similarity criterion, the interfering sound characteristics 123), to generate cleaned output (in time-domain representation, frequency domain representation, or some other representation) in which at least one of the interfering sound components in the combined signal 104 produced by the microphone 116 has been suppressed.

The interfering sound characteristics information, outputted by the voice/sound characteristics module 122, may dynamically change during a call or a session in accordance with changes to the speakers (real or synthesized) associated with the signal 102. For example, if another remote speaker joins an on-going call (e.g., with the speaker 114 in the car cabin 110) the sound characteristics generated by the voice characteristics module 122 (which may either provide previously stored voice characteristics in the form compatible with the unit 124, or may derive from the actual sound signal the appropriate interfering sound characteristics) will change to reflect that there is now a new or an additional interfering sound source generated by the loudspeaker device 112. The change to the sound characteristics information is provided to the unit 124 (e.g., to a machine-learning engine forming part of the unit 124) by the sound/voice characteristics module 122, to cause a change in the behavior of the machine learning engine (e.g., to produce different filter coefficients responsive to the change in the interfering sound characteristics, or to generate actual clean signal output representation). It is to be noted that in addition to the interfering sound characteristics information, the unit 124 may also be provided with other information to control its output, including, for example, a parameter indicating a type of call that is to be (or is being) conducted, an environment parameter identifying the environment in which the call is conducted, an aggressivity parameter to control the level of attenuation that is to be applied, context information (e.g., derived from sensors data collected by various sensors, such as a camera sensor, in the sound environment), and other parameters that help define the required acoustic interference suppression behavior at a given time instance.

As noted, in some examples, the machine learning system of the unit 124 receives the interfering sound characteristics information that indicates which sound sources may be causing acoustic interference (such as echo), along with extracted features representative of a block/segment of an audio sample, and produces in response to these inputs a set of filter coefficients that are applied to the audio sample. The audio sample processed by the generated filter coefficients may be the original noisy sample, or a sample on which some of the initial pre-processing operations, such as equalization, etc., have been performed. Alternatively, the filtering process, achieved by filter coefficients produced by the machine learning system of the unit 124, may be performed in a frequency-domain, producing a resultant filtered (noise suppressed) signal from the input signal provided to the SSE system 120. It is to be noted that while the computation of filter coefficients to apply to noisy audio samples may be performed for every audio block/segment of the audio signals (e.g., 16 ms blocks), the computation of filter coefficient sets by the machine-learning system may only need to be performed intermittently (e.g., at regular or irregular intervals) so that the filter coefficients derived in response to a particular audio segment are applied to one or more consecutive sound segments. By computing filter coefficients intermittently instead of for every incoming sound block/segment, the computation cost (and resultant latency) can be reduced without excessively compromising the speech quality of the sound output signal.

With continued reference to FIG. 1, having applied the derived acoustic interfering suppression filter coefficients to a noisy sound segment/block, a resultant acoustic interference suppressed signal 126 (typically in a frequency-domain representation) is provided to further processing unit 128. The unit 128 is configured to perform various post-filtering operations including, for example, equalization operations, automatic gain control (AGC) operations, inverse transformation operations (e.g., inverse FFT) to convert the processed signal from a frequency domain representation to a time-domain representation, compression and/or encryption operations, etc.

Once output processing is performed, the resultant acoustic interference suppressed output 106 is communicated to the node 130 to either process a user command (if the speech is a response to a voice assistant) or to be transmitted to a far-end communication partner (not shown). There, a user located at the destination node may use a similar interference suppression system to the SSE system 120 to suppress any noise/interference generated at the destination according to the environment and interference sources at the destination. Sound/audio signals produced by the user(s) at the far-end location are processed and transmitted via a communication network and a downlink to the node 130 to be processed and reconstructed in the car cabin 110 in accordance with the processes described herein.

Some illustrative example use cases follow. In a first example use case, a driver is located in his/her car and talking to an in-vehicle navigation system or a personal assistant that is talking back to the person in a British woman's voice. The system may not have a good model for the driver, but has a good model for that British woman and the speech signal enhancement (SSE) has been trained to cancel that voice assistant acoustics as well as other known voices. The SSE may know what synthesis voice is being used or at least the suitable characteristics (embedding) vector to the British woman voice assistant profile in use, and can provide that suitable characteristics as an input or a configuration of the SSE. In a second use case, the known personal assistant voice might come from outside the car, but so long that the system is aware that the voice assistant being used is of the particular known profile (namely, a woman's voice with a British accent), the interference suppression system (be it machine learning system or otherwise) can suppress the voice assistant sound components. In a third use case, the voice assistant may not expressly provide information of the profile used (or no a priori knowledge is provided about identity of a live speaker communicating with the driver, but a speaker recognition system (not illustrated) can determine the identity of the source (and consequently produce or cause to produce appropriate sound characteristics) from a closed known set. In a fourth use case, the speaker is not in the known set, and the system 100 may need to include a new embedding (or some type of sound characteristics) for the unknown speaker and use that. In this case, the derivation of the sound characteristics may require a bit of listening to the new speaker, but can subsequently be stored in a data storage so that there is no need to subsequently recompute sound characteristics for that new speaker (or voice assistant profile).

Figure 2:
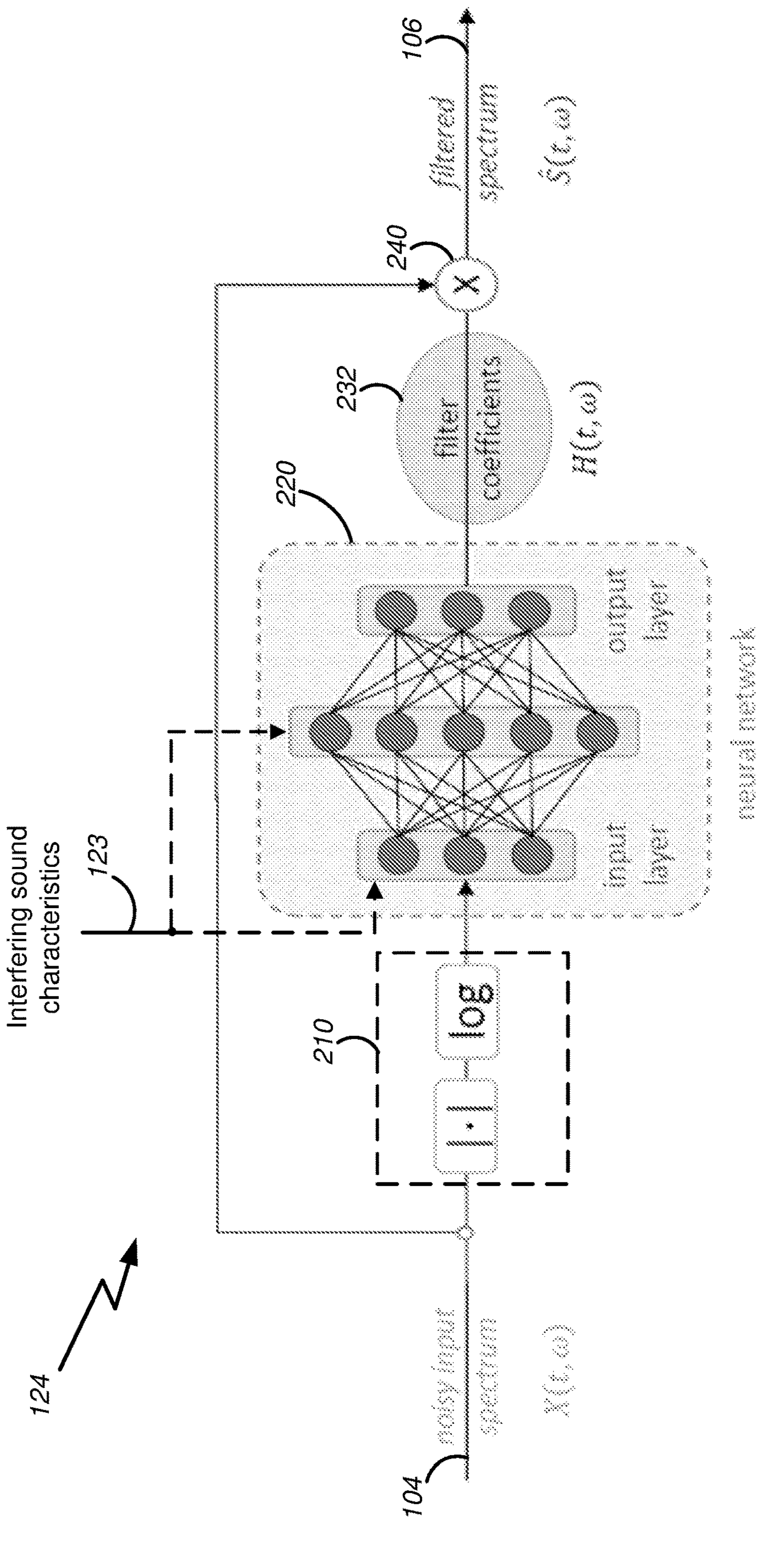
FIG. 2 is a schematic diagram of an example machine learning architecture to implement a speaker-aware speech enhancement unit.

Additional details of the configuration and operation of a machine learning system to implement acoustic interference suppression operations are provided with reference to FIG. 2 showing a schematic diagram of an example machine learning architecture used to implement the speaker-aware speech enhancement unit 124 of FIG. 1 to controllably and dynamically configure the machine learning architecture to process audio signals according to the determination of the interfering sound sources in the sound environment. As illustrated, the architecture of FIG. 2 includes a feature extractor 210 representing feature extraction operations (e.g., to provide compact, sequential input based on the processes input signal). The output of the feature extractor 210 is provided to a DNN 220, which is represented as a neural network with multiple layers (at least one of which is a hidden layer). In an example embodiment, the features extracted from a noisy input signal (represented as a spectrogram $X(t,\omega)$, which may have been derived from a time-domain signal at a stage preceding the feature extractor 210) are provided, along with interfering sound characteristics 123 indicative of sound components that are the associated interfering sound sources in the sound environment captured by a microphone producing the signal 104. The DNN 220 produces, in response to the extracted features from the noisy input signal 104 (comprising the desirable sound components and the interfering sound components) and the interfering sound characteristics a set of interference suppression filter coefficients 232, defining a filter $H(t,\omega)$, that are applied (by an operator 240) to the noisy input $X(t,\omega)$ to produce an output signal $\hat{S}(t,\omega)$ (marked as the output 106 that, as illustrated in FIG. 1 is forwarded to the node 130). The signal $\hat{S}(t, \omega)$ corresponds to a "cleaned" (filtered) audio signal in which at least some of the interfering sound components present in the input signal 104 have been removed or suppressed in accordance with the interfering sound characteristics. To the extent that some of the remove components correspond to the reconstructed acoustic signals for sound signals generated by a remote speaker or by a voice assistant system, the removal of such sound components contributes to reduction of echo effects. And because the unit 124 can remove interfering sound components based on compact information indicating the interfering sound sources, the unit 124 does not require to use and track reference signals of the interfering sound signals in order to achieve the suppression of interfering sound components.

The filter coefficients 232 for $H(t,\omega)$ produced by the DNN 220 are dynamically adaptable in response to specific dynamic audio signal characteristics (represented by the extracted features fed to the DNN 220), and the interfering sound characteristics. The DNN 220 can thus be implemented, in some embodiments, as a universal, adaptable interference suppression system module that does not need to retrieve (i.e., from a look-up table) different sets of coefficients for different required speakers or voice assistant profiles, but rather is implemented using a single set of optimized DNN coefficients, determined during the training stage, to dynamically produce during runtime filter coefficients that are applied to received sound signals. Alternatively, in various example embodiments, a machine-learning model for particular speakers or voice assistant profiles may be selected (e.g., based on the interfering sound characteristics information) and downloaded for use by the DNN 220. Furthermore, as noted, instead of producing filter coefficients for H(t,ω), the DNN may produce the actual predicted clean output responsive to the noisy input signal 104 and the interfering sound characteristics 123.

The DNN 220 of FIG. 2 is depicted as being realized based on a neural network architecture. However, the DNN 220 may be replaced by other types of machine learning approaches/architectures. Neural networks are in general composed of multiple layers of linear transformations (multiplications by a "weight" matrix), each followed by a nonlinear function (e.g., a rectified linear activation function, or ReLU, etc.) The linear transformations are learned during training by making small changes to the weight matrices that progressively make the transformations more helpful to the final learned task.

Examples of neural networks include convolutional neural network (CNN), feed-forward neural networks, recurrent neural networks (RNN, implemented, for example, using long short-term memory (LSTM) structures), etc. Feed-forward networks include one or more layers of perceptrons (learning nodes/elements) with connections to one or more portions of the input data. In a feedforward network, the connectivity of the inputs and layers of perceptrons is such that input data and intermediate data propagate in a forward direction towards the network's output. There are typically no feedback loops or cycles in the configuration/structure of the feed-forward network. Convolutional layers allow a network to efficiently learn features by applying the same learned transformation to subsections of the data. Other examples of learning engine approaches/architectures that may be used include generating an auto-encoder and using a dense layer of the network to correlate with probability for a future event through a support vector machine, constructing a regression or classification model, etc.

In various embodiments the learning engine implementations may include a trained learning engine (e.g., a neural network) and a corresponding coupled learning engine controller/adapter configured to determine and/or adapt the parameters (e.g., neural network weights) of the learning engine that would produce output representative of cleaned/filtered audio samples in response to noisy input audio data and/or noise reduction profile information. In such implementations, training data includes sets of input audio sample representations (clean samples and noisy samples, in a time-domain representation, a transformed domain representation, extracted features representation, or other types of representations) along with corresponding output data comprising desired filtered (cleaned) audio sample representations (such output data is referred to as target or label data). The input and output training data together define the ground truth for the machine learning model being implemented. After initial training of the learning engine, subsequent training may be intermittently performed (at regular or irregular periods). Upon completion of a training cycles by the adapter/controller coupled to a particular learning engine, the adapter provides data representative of updates/changes (e.g., in the form of parameter values/weights to be assigned to links of a neural-network-based learning engine) to cause the learning engine to be updated in accordance with the training cycle(s) completed. During training neural network errors are computed based on distance between network output (responsive to the input data) and the desired target. Based on this error, the neural network weights are optimized with, for example, gradient descent processing to minimize the error.

Figure 5:
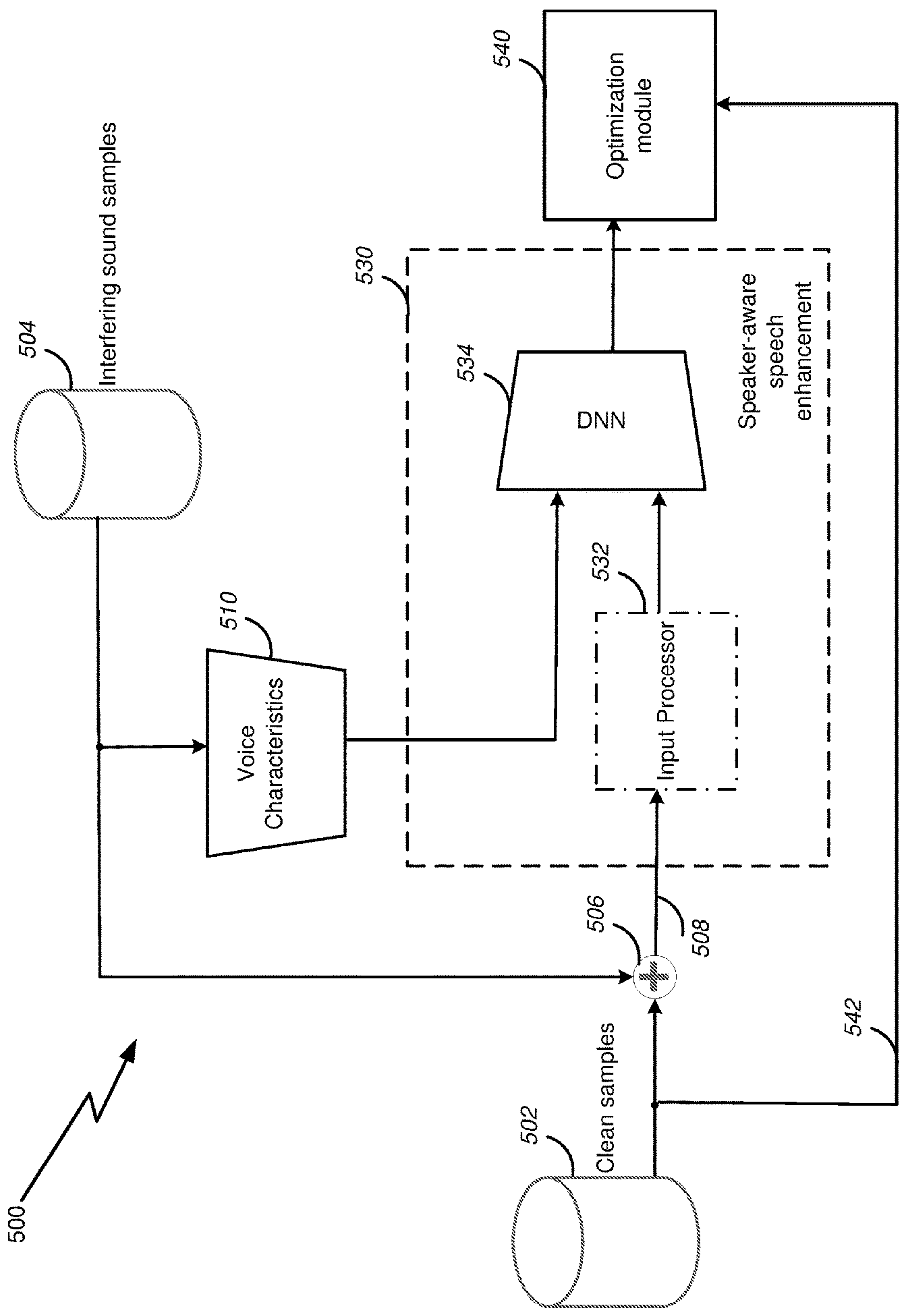
FIG. 5 is a schematic diagram of a system for training a DNN of an interference suppressing system.

More particularly, training the machine learning engine (e.g., the DNN 220) may be performed by using clean speech (audio) spectrum as the desired output to be produced by applying the filter coefficients outputs (generated by the learning engine) to the noisy input audio signal representation. This approach, therefore, requires knowledge of the clean speech sample (be it as a time domain representation or a spectral representation). FIG. 5 is a schematic diagram of a system 500 for training a DNN 534 (which may be similar to the DNN 220 of FIG. 2) that is included with some of the speaker-aware speech enhancement implementations described herein. The system 500 typically has access to a data repository 502 that includes clean speech samples (e.g., pre-recorded conversation segments) that correspond to the desirable sound sources that would be produced within a noisy environment (a car cabin). Generally, the speech samples in the repository 502 are provided as a time-domain electrical signal representation (analog or digital). A clean speech sample from the repository 502 is combined, by an adder 506, with an interfering sound sample, which may correspond to various undesirable sound sources that would be present within the noisy environment for which the DNN 534 is to be trained. For example, a repository 504 may include samples of synthesized speech produced by a voice assistant system coupled to a loudspeaker(s), and/or speech samples for human speakers as they would sound when played over loudspeakers. The addition/combining of the interfering sound samples and the clean sound samples produces noisy signal(s) 508 either in acoustic form (or as an electrical time-domain signal representation). If the resultant noisy signal 508 is an acoustic signal, a microphone would need to be include in the system configuration 500 to convert the acoustic form into an electrical signal representation that can be processed by the speaker-aware speech enhancement unit 530.

As further illustrated in FIG. 5, an interfering sound sample accessed from the repository 504 is also provided to a voice characteristics module 510 to determine sound/voice characteristic data representative of the undesirable (interfering) sound signals. For example, the voice characteristics module 510 may be a neural network implementation to convert a sound sample into an embedding in a vector space. Alternatively, the voice characteristics module 510 may be a feature extractor producing, for example, spectral features corresponding to the particular sample accessed from the repository 504, or the module 510 may map the sound signal into an identification value representing the sound sample. In some examples, the voice characteristics may have been pre-determined and stored in the repository 504 such that when a particular interfering sound sample is accessed, its associated sound characteristics is also accessed and provided to the module 510. It is to be noted that in embodiments in which the module 510 is realized as a trainable machine learning system (be it a neural network architecture, or some other machine learning architecture), the module 510 may be trained jointly with the DNN 534. That is, if the voice characteristics module 510 is a neural network implementation trained to predict embeddings in a configurable vector space, the optimization of the parameters of the module 510 and of the DNN 534 may be performed jointly.

The DNN 534 thus receives voice characteristics data (applied to an input layer of the DNN 534, or to an intermediate layer) produced by the module 510, and noisy sound data which optionally may be processed by the input processor 532 performing at least some of the pre-processing operations discussed with respect to FIGS. 1 and 2. Responsive the sound/voice characteristics data and the noisy data, the DNN 534 produces, during training time, predicted data (be it filter coefficients or actual interference suppressed sound sample representations) that is forwarded to an optimization module that seeks to minimize the error between the clean sound sample data (provided to the optimization module as data sample 542) and resultant interference suppressed data generated according to the predicted data of the DNN 534. For example, if the DNN 534 produces filter coefficients, the optimization module may first perform filtering operations (based on the predicted coefficients) applied to the noisy data, and adjust parameters of the DNN 534 and/or the module 510 that seek to reduce the error between the output sound data produced by the DNN 534 and the clean sample data provided to the optimization module 540. Minimization of the error between output data that is based on the resultant data of the DNN 534, and clean sound sample data (marked as the data sample 542) may be performed by minimizing an error value of a cost function using, for example, a gradient descent process. The training process is iteratively repeated using different clean and interfering sound samples until some minimization performance criterion is met.

Another way to obtain training samples would be to record the speech produced by local speakers in response to speech from a remote speaker(s) provided to the local speaker through headsets. The local speaker's and the remote speaker's speeches can then be replayed through loudspeakers deployed in a sound environment and the resultant combined speech produced through the loudspeakers can be recorded. This setup would thus provide the clean speech (local speaker's speech in isolation from the remote speaker's speech) and the noisy speech (the local speaker's speech combined with the interfering remote speaker's speech). This setup can be repeated for a large number of loudspeakers with different configuration of noise environments (e.g., in car cabins, office, home environments, etc., and with different configurations of deployed loudspeaker devices and microphones). Another way to obtain training samples is to have human speakers repeat scripted dialogues twice, the first time with remote speaker's sound not produced within the noise environment (i.e., the local speaker would wear headsets), and the second time with the remote speaker's sound produced by loudspeaker devices deployed within the sound environment. Other ways to produce training samples (e.g., through artificial production of speech samples) can also be used.

Figure 3:
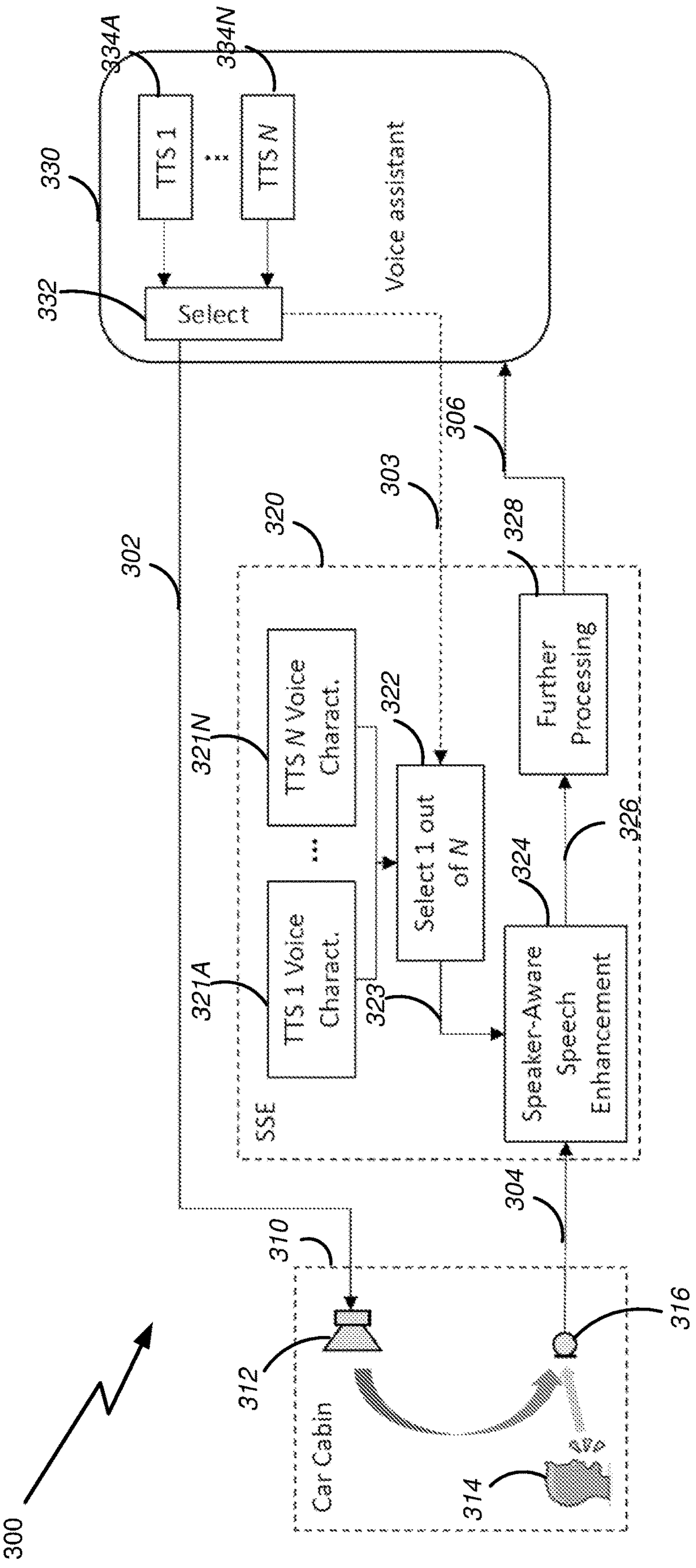
FIG. 3 is a schematic diagram of another example acoustic interference suppression system.

With reference next to FIG. 3, a schematic diagram of another example embodiment of an acoustic interference suppression system 300 is shown. Under the implementation of FIG. 3, the system 300 includes a voice assistant 330 in which N different voice assistant profiles (causing synthetization of speech having N different voice characteristics, corresponding to different accents, genders, ages, etc.) are available for selection, using a selector 332 by a speaker 314 or by someone else (a technician, administrator, owner of the system, etc.) In the example implementation of FIG. 3, the selection of one of N text-to-speech (TTS) profiles 334A-N activates that profile and causes generation of synthesized speech signals (in the time domain) with voice/sound characteristics commensurate with the selected profile. The generated synthesized sound signals (represented as a signal 302) are forwarded to a loudspeaker device 312 in the car cabin 310, where the sound signal 302 is converted to an acoustic signal. Similar to the sound environment of the car cabin 110 depicted in FIG. 1, the sound environment constituted by the car cabin 310 may include any number of loudspeaker devices and any number of microphones, but for the sake of simplicity only one loudspeaker device 312 and one microphone 316 are shown.

As further illustrated in FIG. 3, voice assistance selector information, identifying the selected profile is also provided, as signal 303, to Speech Signal Enhancement (SSE) system 320. The SSE system 320 is configured to perform acoustic interference suppression on a combined, multi-component sound signal 304 produced by the microphone 316 to suppress, or even remove, sound components that correspond to interfering sound sources in the sound environment. In this example, the interfering sound components are the voice assistant speech components that are produced by the loudspeaker device 312. To avoid echo (and/or other forms of acoustic interference that may muddle the intelligibility of the speech produced by the loudspeaker device 312), the SSE system 320, through the speaker-aware speech enhancement unit 324 (which may be implemented similarly, in some embodiments, to the unit 124 of FIG. 1) processes the multi-component sound signal 304 to produce a resultant signal 326, at the output of the unit 324, in which at least one of the interfering sound components included in the multi-component sound signal 304 have been suppressed and/or removed. The resultant signal 306 (with at least one interfering sound component having been suppressed) then undergoes post-processing by a further processing unit 328 which, similarly, to the unit 128, is configured to perform various post-filtering operations on the signal 326, including, for example, equalization operations, automatic gain control (AGC) operations, and/or inverse transformation operations (e.g., inverse FFT) to convert the processed signal from a frequency domain representation to a time-domain representation (i.e., in situations where the unit 324 produces a frequency-domain representation), compression and/or encryption operations, etc. The post-filtering operations result in an output signal 306.

The signal 303, representative of the selected voice assistance (TTS) profile from the N available profiles 334A-N is provided to a selector (multiplexor) 322 of the SSE system 320 which is configured to select one of N available voice characteristics records that, when provided to the unit 324, cause (actuate or modulate) the unit to adaptively perform suppression operations on the signal 304 to suppress at least one interfering sound component from the multi-components of the signal 304. The speaker-aware speech enhancement unit 324 may be, in some implementations, a machine learning system in which a machine-learning engine, trained on training samples that include clean and noisy sound signal samples, along with voice characteristics of a format and configuration similar to that provided by the N TTS voice characteristics stored in a memory device of the SSE system 320, produces clean sound sample output that suppresses sound components associated with the selected TTS profile. For a particular sound profile, the voice characteristics may include, for example, an embedding vector from a vector space defined by a machine learning system that outputs compact vector representations (parameterized representations) of sound/voice samples. However, instead of processing sounds samples to produce voice characteristics during runtime (which could be a computationally intensive effort), the embodiments of FIG. 3 use a look-up table (arranged as records 321A-N) of pre-computed voice characteristics. In some examples, the voice characteristics may include extracted features, e.g., log mel spectra features or mel-frequency cepstral coefficients, to provide a representation of sound samples produced by the selected voice assistance profile. Alternatively, the voice characteristics may simply be the profile identifier indicated by the signal 303 (in which case it may not be necessary to store voice characteristics records). Other types of voice characteristics information may also be implemented and used. While the example of FIG. 3 illustrates sound (voice) characteristics records for TTS profiles, it is noted that sound characteristics records for actual known speakers may also be maintained in a memory device of the SSE system 320. Furthermore, such a memory device may be updated from time to time to replace or augment the records with voice characteristics records of new speakers or of new voice assistance profiles.

As noted, the unit 324 may include a machine learning engine that produces output responsive to the voice characteristics from the selector 322. In various example embodiments, the machine learning engine (which may be implemented similarly to the DNN 220 of FIG. 2) may be configured to produce filter coefficients responsive to input data representative of a current segment of the signal 304 (or of an input processed signal produced by an input processor, similar to that described in relation to FIG. 1, to perform various preliminary processing operations) and the sound characteristics provided by the selector 322. The input data representative of the current segment of the signal 304 can include spectral features that are derived by a feature extractor similar to the feature extractor 210 of FIG. 2. The filter coefficients produced by the machine learning engine of the unit 324 can then be applied to the sound signal 304 (or some processed version thereof) to produce the clean signal 326 in which at least one interfering sound component, associated with sound characteristics matching those selected by the selector 322, is suppressed. Here too, the resultant acoustic interference suppressed signal is generated without requiring a reference signal to match up to sound components of the signal 304. In alternative embodiments, the machine learning engine of the unit 324 is configured to produce resultant predicted signal output from either the signal 304 (or a processed version of it) or from features extracted from the signal 304 (e.g., spectral features). In such embodiments, the predicted output is processed (e.g., transformed, for example, by the unit 328) into a time-domain representation of the predicted output signal produced by the machine learning engine.

It is to be noted that in some example embodiments the SSE system 320 may store pre-computed machine learning models (represented as the weights to be assigned to the various machine learning interconnections between the nodes of the machine learning engine). In such embodiments, one of the stored models corresponding to a particular speaker or voice assistance profile currently providing the sound signals that are produced by the one or more loudspeaker devices in the sound environment is downloaded to the machine learning engine in response to identification of the particular speaker of voice assistance profile.

Figure 4:
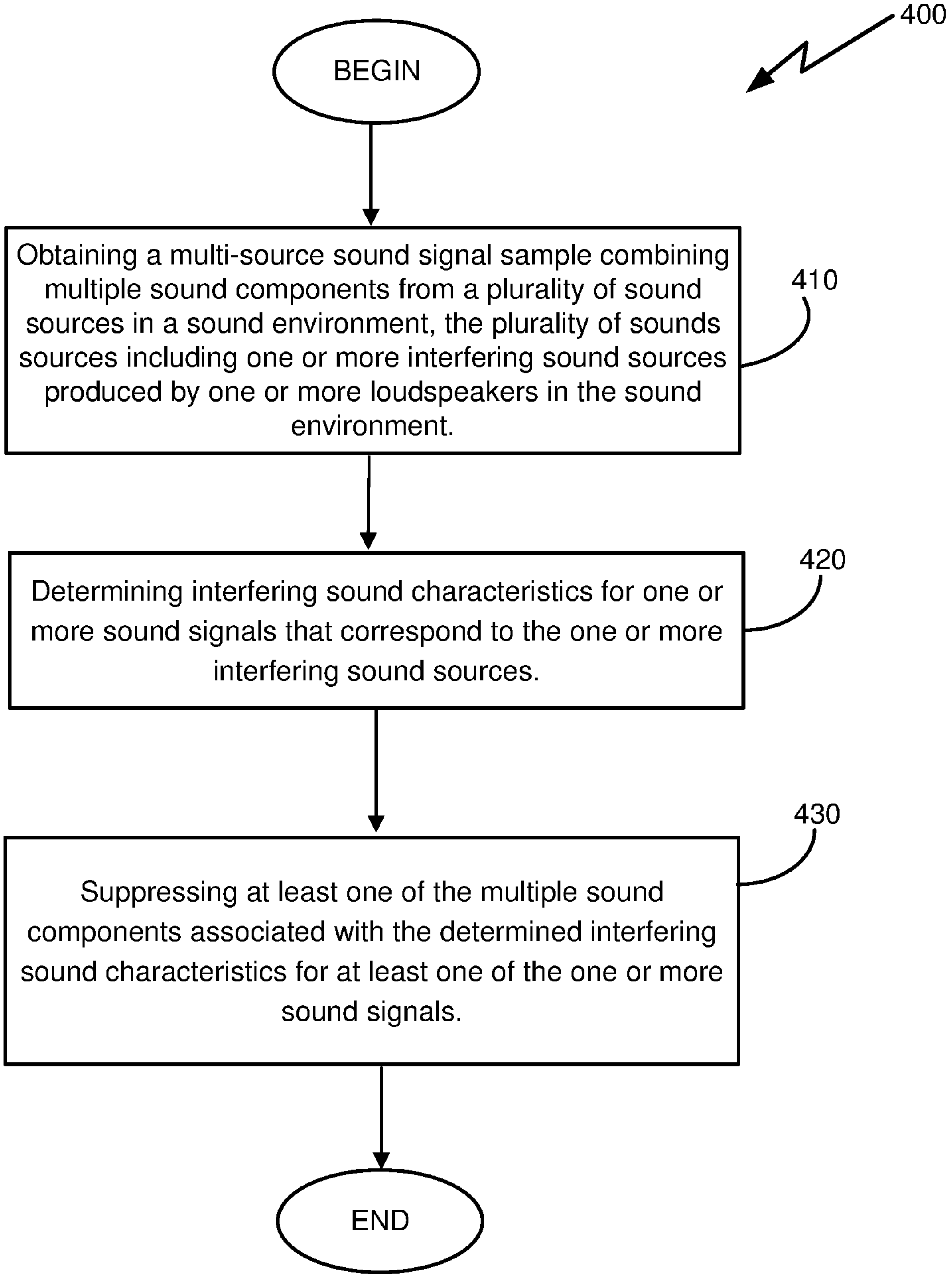
FIG. 4 is a flowchart of an example procedure for acoustic interference suppression.

With reference next to FIG. 4, a flowchart of an example procedure 400 for acoustic interference suppression is provided. The procedure 400 includes obtaining 410 a multi-source sound signal sample combining multiple sound components from a plurality of sound sources in a sound environment, with the plurality of sounds sources including one or more interfering sound sources produced by one or more loudspeakers in the sound environment. The procedure 400 additionally includes determining 420 interfering sound characteristics for one or more sound signals that correspond to the one or more interfering sound sources, and suppressing 430 at least one of the multiple sound components associated with the determined interfering sound characteristics for at least one of the one or more sound signals.

In some examples, at least one of the one or more interfering sound sources may include a voice assistant audio produced using a voice assistant profile selected from a plurality of voice assistant profiles maintained by a text-to-speech voice assistant system. In such examples, determining the interfering sound characteristics may include selecting from data storage (that stores respective interfering sound characteristics for the plurality of voice assistant profiles) a selected interfering sound characteristics corresponding to the selected voice assistant profile. Suppressing the at least one of the multiple sound components may include receiving, by an interference suppressing machine learning system trained to controllably suppress voice assistant sound components according to interfering sound characteristics respectively associated with the plurality of voice assistant profiles, with the selected interfering sound characteristics corresponding to the selected voice assistant profile, and sound data representative of the multi-source sound signal sample, and processing the sound data by the interference suppressing machine learning system according to the selected interfering sound characteristics to produce output data representative of an output sound sample in which at least one of the multiple sound components, associated with sound produced according to the selected voice assistant profile, is suppressed.

Processing the sound data with the interference suppressing machine learning system may include determining, by the machine learning system, filter coefficients for a time-varying linear filter based on at least part of the sound data and the selected interfering sound characteristics, and applying the determined filter coefficients to at least part of a representation of the multi-source sound signal sample to yield an interference suppressed output sound signal. Processing the sound data with the interference suppressing machine learning system may include generating, by the interference suppressing machine learning system, predicted output representative of the output sound sample in which the at least one of the multiple sound components is suppressed.

The computation of interfering sound characteristics may be performed in real-time. Thus, in such examples, determining interfering sound characteristics may include receiving the one or more sound signals that produce the one or more interfering sound sources, and deriving from the one or more sound signals the determined interfering sound characteristics. Suppressing the at least one of the multiple sound components may include receiving, by an interference suppressing machine learning system trained to controllably suppress the at least one of the multiple sound components according to the interfering sound characteristics, the derived interfering sound characteristics and sound data representative of the multi-source sound signal sample, and processing the sound data by the interference suppressing machine learning system according to the interference data to produce output data representative of an output sound sample in which the at least one of the multiple sound components is suppressed. Processing the sound data with the interference suppressing machine learning system may include determining, by the interference suppression machine learning system, filter coefficients for a time-varying linear filter based on at least part of the sound data and the interference data, and applying the determined filter coefficients to at least part of a representation of the multi-source sound signal sample to yield an interference suppressed output sound signal. In some examples, processing the sound data with the interference suppressing machine learning system may include generating, by the interference suppressing machine learning system, predicted output representative of the output sound sample in which the at least one of the multiple sound components is suppressed.

The determined interfering sound characteristics may include one or more of, for example, a vector representation in an embedding vector space for the one or more sound signals, spectral characteristics for the one or more sound signals, temporal characteristics for the one or more sound signals, and/or identifier data representative of identify of sources producing the one or more sound signals. Suppressing the at least one of the multiple sound components may include suppressing the at least one of the multiple sound components without using a reference signal for any of the plurality of sound sources, to reduce echo effects caused by sound components produced by the one or more loudspeakers.

Suppressing the at least one of the multiple sound components may include receiving by the interference suppressing machine learning system interference data representative of the interfering sound characteristics, receiving sound data representative of the multi-source sound signal sample, and processing the sound data by the interference suppressing machine learning system according to the interference data to produce output data representative of an output sound sample in which the at least one of the multiple sound components is suppressed. In such examples, receiving the sound data may include converting, by an acoustic transducer device, a raw sound sample into a time-domain sound signal, transforming the time-domain sound signal into a transformed domain representation, and extracting features from the transformed domain representation to produce the sound data. Extracting the features may include deriving from the transformed domain representation one or more of, for example, complex signal spectra features, spectral magnitude features, log spectral magnitude features, log mel spectra features, and/or mel-frequency cepstral coefficients.

In some examples, the predicted output of the interference suppressing machine learning system may include one or more of, for example, a temporal representation of the output sound sample, or a spectral representation of the output sound sample.

Suppressing the at least one of the multiple sound components may include providing the interfering sound characteristics to a machine learning system executing a single machine learning model trained to controllably suppress acoustic interference sound components in input sound signals according to different sound characteristics for a plurality of interference sound signals associated with one or more speakers or one or more voice assistant profiles sources, and processing sound data, representative of the multi-source sound signal sample, provided as input to the machine learning system based on the determined interfering sound characteristics provided to the machine learning system to produce output data representative of an output sound sample in which the at least one of the multiple sound components is suppressed. Providing the determined interfering sound characteristics to the machine learning system may include providing the determined interfering sound characteristics to one or more of, for example, an input layer of the machine learning system, and/or one or more intermediate hidden layers of the machine learning system.

Implementation described herein, including implementations using neural networks, can be realized on any computing platform, including computing platforms that include one or more microprocessors, microcontrollers, and/or digital signal processors that provide processing functionality, as well as other computation and control functionality. The computing platform can include one or more CPU's, one or more graphics processing units (GPU's, such as NVIDIA GPU's), and may also include special purpose logic circuitry, e.g., an FPGA (field programmable gate array), an ASIC (application-specific integrated circuit), a DSP processor, an accelerated processing unit (APU), an application processor, customized dedicated circuitry, etc., to implement, at least in part, the processes and functionality for the neural network, processes, and methods described herein. The computing platforms typically also include memory for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc. The various learning processes implemented through use of the neural networks may be configured or programmed using TensorFlow (a software library used for machine learning applications such as neural networks). Other programming platforms that can be employed include keras (an open-source neural network library) building blocks, NumPy (an open-source programming library useful for realizing modules to process arrays) building blocks, etc.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Additional details regarding the embodiments described herein are provided in Appendix A appended hereto.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for suppressing acoustic interference, the method comprising:

obtaining a sample of a multi-source sound signal, wherein the sample includes sound components from sound sources that are in a sonic environment, wherein the sound sources include an interfering sound-source that is produced by a loudspeaker in the sonic environment, and wherein the multi-source sound signal includes an interfering signal from the interfering sound source;

determining sound characteristics of the interfering signal;

causing a machine-learning system to receive sound data that represents the multi-source sound signal, the machine-learning system being an interference-suppressing machine-learning system that has been trained to suppress sound produced by the interfering sound source; and using the machine-learning system, suppressing the interfering signal that is in the sample of the multi-source sound signal.

2. The method of claim 1, wherein the interfering sound source includes audio from a voice assistant, the audio having been produced using a voice-assistant profile selected from among a plurality of voice-assistant profiles that are maintained by a text-to-speech voice-assistant system.

3. The method of claim 1, wherein determining sound characteristics for the interfering signal comprises selecting, from data storage, interfering sound characteristics that correspond to a selected voice-assistant profile.

4. The method of claim 1, wherein suppressing the interfering signal comprises causing the machine-learning system to process the sound data according to the sound characteristics and to produce output data that represents an output sound sample, wherein, in the output sample, the sound produced by the interfering sound source has been suppressed.

5. The method of claim 1, wherein suppressing the interfering signal comprises causing the machine-learning system to determine filter coefficients for a time-varying linear filter based on the sound data and the sound characteristics of the interfering signal and applying the filter coefficients thus determined to a representation of the sample of the multi-source sound signal to yield an interference-suppressed output sound-signal.

6. The method of claim 1, wherein suppressing the interfering signal comprises causing the machine learning system to generate predicted output in which the interfering signal has been suppressed.

7. The method of claim 1, wherein determining the sound characteristics of the interfering signal comprises receiving a sound signal produced by the interfering sound source and deriving the characteristics of the interfering signal from that sound signal.

8. The method of claim 1, wherein suppressing the interfering signal comprises causing the machine-learning system to receive characteristics of the interfering signal that have been derived from a sound signal provided by the interfering sound source and to use the characteristics for providing an output that represents the sound signal with the interference signal having been suppressed.

9. The method of claim 1, wherein determining the sound characteristics of the interfering signal comprises determining a vector representation for the interfering signal.

10. The method of claim 1, wherein determining the sound characteristics of the interfering signal comprises determining spectral characteristics for the for the interfering signal.

11. The method of claim 1, wherein determining the sound characteristics of the interfering signal comprises determining identifier data that identifies the interfering sound-source.

12. The method of claim 1, wherein suppressing the interfering signal comprises avoiding use of a reference signal for any of the sound sources to reduce echo effects caused by those sound sources.

13. The method of claim 1, wherein determining the sound characteristics comprises causing the machine-learning system to receive interference data, the interference data being data that represents the sound characteristics, causing the machine-learning system to receive sound data, the sound data being data that represents the sample of the multi-source sound signal, and causing the machine-learning system to produce output data that represents an output sound sample in which the interfering signal has been suppressed.

14. The method of claim 1, wherein determining the sound characteristics comprises causing an acoustic transducer to convert a raw sound sample into a time-domain sound signal, transforming the time-domain sound signal into a transformed domain representation, and extracting features from the transformed domain representation to produce the sound characteristics.

15. The method of claim 1, wherein determining the sound characteristics comprises causing an acoustic transducer to convert a raw sound sample into a time-domain sound signal, transforming the time-domain sound signal into a transformed domain representation, and deriving from the transformed domain representation one or more of: complex signal spectra features, spectral magnitude features, log spectral magnitude features, log mel spectra features, or mel-frequency cepstral coefficients.

16. The method of claim 1, wherein suppressing the interfering signal comprises causing the machine learning system to generate predicted output in which the interfering signal has been suppressed, wherein the predicted output comprises at least one of: a temporal representation of an output sound sample and a spectral representation of an output sound sample, wherein, in the output sound sample, the sample, the sound produced by the interfering sound source has been suppressed.

17. The method of claim 1, wherein the machine learning system includes an input layer and wherein the method further comprises providing the determined sound characteristics to the input layer.

18. The method of claim 1, wherein the machine learning system includes an intermediate hidden layer and wherein the method further comprises providing the determined sound characteristics to the intermediate hidden layer.

19. An apparatus for suppressing acoustic interference, the apparatus comprising:

an audio acquisition section that obtains a sample of a multi-source sound signal that includes sound components from sound sources that are in a sonic environment, the multi-source sound signal including an interfering signal from an interfering sound source that is among the sound sources, wherein the interfering sound-source is produced by a loudspeaker in the sonic environment, and a controller that is in electrical communication with the audio acquisition section, the controller being an acoustic interference suppression controller that comprises a machine-learning system that has been trained to suppress sound produced by the interfering sound source, wherein the controller is configured to receive sound data that represents the multi-source sound signal and to suppress the interfering signal that is in the sample of the multi-source sound signal.

20. A manufacture comprising a non-transitory computer readable medium that stores instructions for causing a machine to carry out steps of:

obtaining a sample of a multi-source sound signal, wherein the sample includes sound components from sound sources that are in sonic environment, wherein the sound sources include an interfering sound-source that is produced by a loudspeaker in the sonic environment, and wherein the multi-source sound signal includes an interfering signal from the interfering sound source;

determining sound characteristics of the interfering signal;

causing a machine-learning system to receive sound data that represents the multi-source sound signal, the machine-learning system being an interference-suppressing machine-learning system that has been trained to suppress sound produced by the interfering sound source; and using the machine-learning system, suppressing the interfering signal that is in the sample of the multi-source sound signal.

* * * * *